United States Patent [19]

Vance

[11] 4,079,959
[45] Mar. 21, 1978

[54] TRACTOR AND SEMI-TRAILER SAFETY DEVICE

[76] Inventor: Charles E. Vance, Thetford Center, Vt. 05075

[21] Appl. No.: 696,845

[22] Filed: Jun. 17, 1976

[51] Int. Cl.² ............................................. B62D 53/08
[52] U.S. Cl. .................................... 280/432; 280/451
[58] Field of Search .................... 280/432, 433, 446 B, 280/451

[56] References Cited

U.S. PATENT DOCUMENTS

| 2,773,701 | 12/1956 | Safko | 280/432 |
| 2,815,224 | 12/1957 | Waters | 280/432 |

*Primary Examiner*—Joseph F. Peters, Jr.
*Assistant Examiner*—John A. Pekar
*Attorney, Agent, or Firm*—Clarence A. O'Brien; Harvey B. Jacobson

[57] ABSTRACT

A tractor-trailer combination has a safety stop arrangement mounted on the trailer coupler base member for limiting relative pivotal movement of the trailer and tractor by engaging in a slot provided in the fifth wheel of the tractor and stopping undesirable movement. If sufficient force is created by the relative movement of the tractor and trailer, the tractor-trailer pin coupling will part before the break point of the safety stop arrangement is reached and the trailer will be separated from the tractor in order to prevent a serious jackknifing situation.

10 Claims, 4 Drawing Figures

TRACTOR AND SEMI-TRAILER SAFETY DEVICE

BACKGROUND OF THE INVENTION

1. Field of the Invention

This invention relates generally to the coupling between a tractor and a trailer in a tractor-trailer combination, and particularly to a safety stop arrangement for preventing excessive angular movement between a tractor and trailer and for permitting the trailer to separate from the tractor when the forces causing relative movement between a trailer and its associated tractor become excessive, as in extreme jackknifing situations and the like.

2. Description of the Prior Art

The conventional tractor-trailer combination has traditionally had difficulties with the tractor and trailer coming too close together, and even striking one another, when the rig is being parked or backed up, and when a jackknifing situation occurs. The latter is merely a generic term describing various conditions of uncontrolled movement the rig, such as striking another vehicle, skidding, and other mishaps. In both instances, the basic problem is that the angular disposition between the trailer and the tractor becomes essentially zero and the tractor strikes against the trailer, with potentially great damage resulting.

Various proposals have been made for preventing the tractor and trailer of a tractor-trailer combination from coming together in the manner described above. Examples of the known devices can be found in U.S. Pat. Nos. 2,146,145, issued Feb. 7, 1939, to J. D. Huffman, et al.; 2,723,865, issued Nov. 15, 1955, to A. L. Leoni; 2,772,894, issued Dec. 4, 1956, to W. K. Oats; and 2,773,701, issued Dec. 11, 1956, to W. T. Safko. While the aforementioned prior patents relate to mechanical limit stop arrangements or tractor-trailer combinations, U.S. Pat. Nos. 3,517,946, issued June 30, 1970, to R. D. Rumsey, et al. and 3,520,557, issued July 14, 1970, to G. W. Kamman, et al., disclose devices dampen the relative movement between the tractor and trailer in order to limit same.

SUMMARY OF THE INVENTION

It is an object of the present invention to provide a safety stop arrangement for a tractor-trailer combination which will limit pivotal movement between the tractor and trailer in a more reliable manner than known arrangements for this purpose.

It is another object of the present invention to provide a safety stop arrangement capable of resisting greater forces than known safety stop arrangements can resist.

It is yet another object of the invention to provide a safety stop arrangement for a tractor-trailer combination which has a higher break-point than the coupling arrangement between the tractor and trailer in order to cause separation of the trailer from the tractor during predetermined excessive force situations.

These and other objects are achieved according to the present invention by providing a safety stop device having: a body mountable on the coupler base member of a semi-trailer, and the like; and a bar pivotally mounted on the body and arranged for engaging the conventional slot of a fifth wheel provided on the tractor whenever the angular disposition between the tractor and trailer exceeds a predetermined value.

According to a preferred construction of the invention, the body is a sleeve forming a cavity of substantially rectangular cross section. The coupler base member is provided with an opening communicating with the cavity, and the block is pivotally mounted within the cavity and provided with at least one projection which contacts a shoulder provided in the sleeve whenever the block is in its down or fifth wheel engaging position so that blows received by the block are imparted to the shoulder. By providing, for example, a pair of oppositely directed projections each engageable with an associated shoulder provided in the sleeve, very large forces can be absorbed by the safety stop device without damage to, or breakage of, a shaft which pivotally mounts the block within the sleeve of the body of the device.

A compression spring is arranged between and contacts both the block and a cover member arranged over the body sleeve. By this arrangement, the block is biased toward an opening provided in the coupler base member and also toward the fifth wheel so as to drop into the slot provided in the fifth wheel whenever the slot is in alignment with the opening provided in the coupler base member.

In use, a pair of the safety stop devices discussed above will be mounted on opposite sides of the fifth wheel pin conventionally provided on a trailer for coupling the trailer to an associated tractor. The provision of two symmetrically arranged devices will afford protection to the rig, or tractor-trailer combination, in both directions of possible relative movement between the trailer and the tractor.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
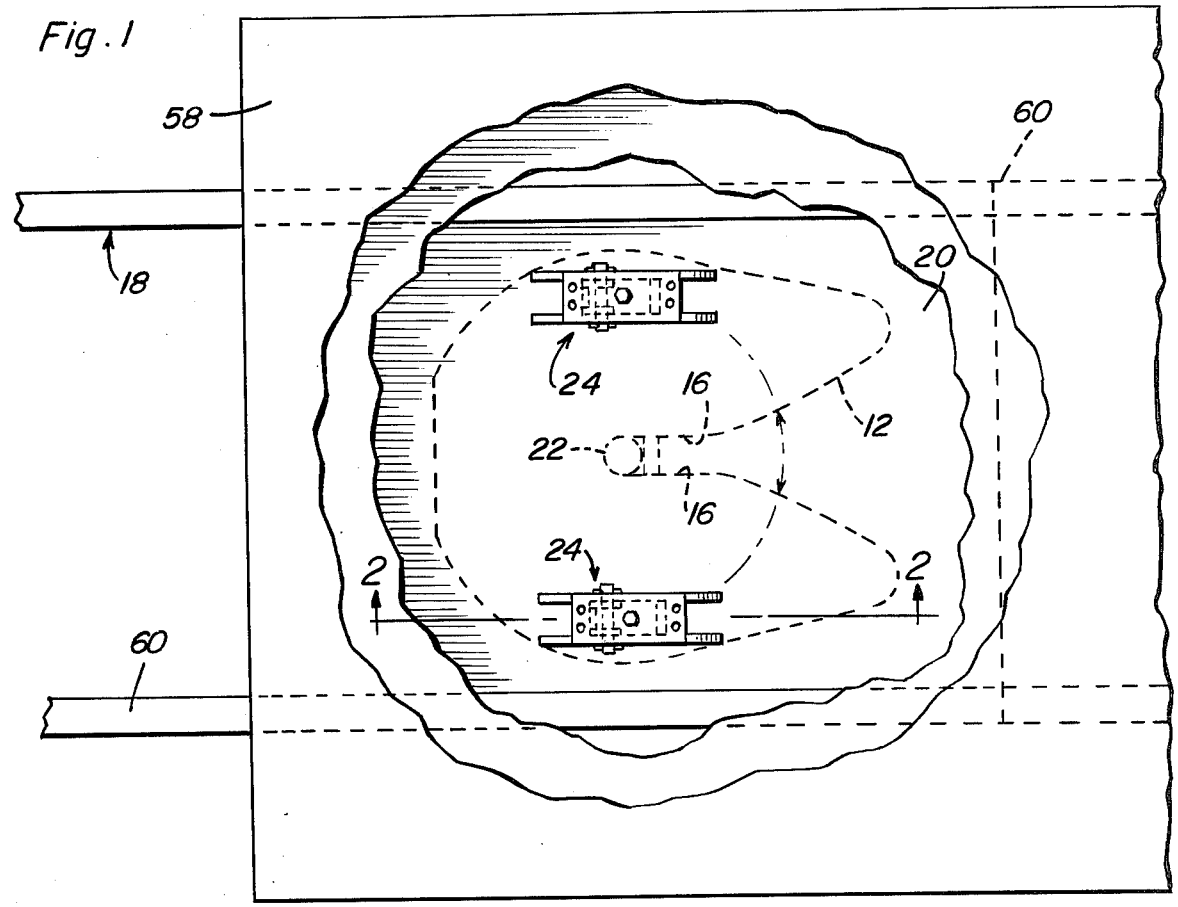
FIG. 1 is a fragmentary, top plan view, partly cut away, showing a pair of safety stop devices according to the present invention mounted on the coupler base member, or plate, of a conventional tractor-trailer combination.
Figure 2:
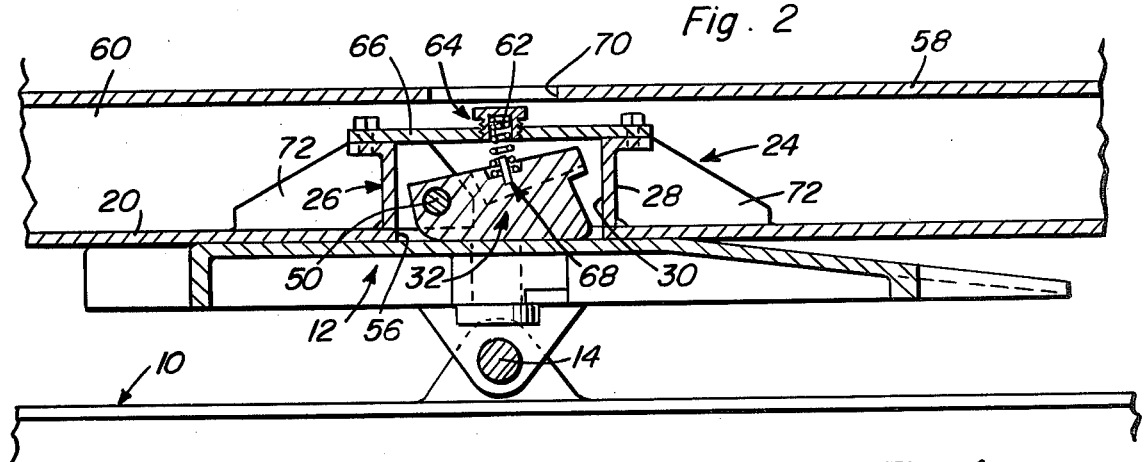
FIG. 2 is a fragmentary, enlarged, sectional view taken generally along the line 2—2 of FIG. 1.
Figure 3:
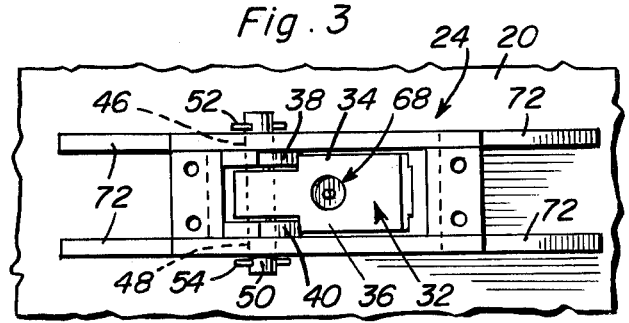
FIG. 3 is a fragmentary, top plan view of one of the safety stop devices according to the invention as seen in FIG. 1, but with the cover member and compression spring arrangement removed.

Referring now more particularly to FIGS. 1 through 3 of the drawing, a conventional tractor-trailer combination includes a tractor 10 having a conventional fifth wheel 12 mounted on a horizontal pivot 14 and provided with a slot 16 which converges from the periphery to a central axis portion of fifth wheel 12. A trailer 18 has a coupler base member 20 provided with a depending fifth wheel pin 22, or king pin, disposed for pivotally engaging with the slot 16 of fifth wheel 12. It will be appreciated that although pin 22 is illustrated as being located at the innermost portion of slot 16, the exact position of pin 22 in slot 16 may vary somewhat in dependence on various conditions encountered by the tractor-trailer combination. A pair of safety stop devices 24 are mounted on base member 20 for limiting pivotal movement of base member 20 and fifth wheel 12 relative to one another and preventing the tractor 10 and trailer 18 from coming around to strike one another during parking, backing, and various jackknifing situations. In particular, the particular construction of the safety stop devices 24 as to be described below, results in not only very reliable positive stopping action, but also in the safety stop devices 24 being capable of resisting much greater forces than can pin 22. Accordingly, pin 22 will part before the break point of the safety stop devices 24 is reached, so that trailer 18 will be separated from tractor 10 during various extreme jackknifing and similar emergency situations.

The invention can be employed with fifth wheels constructed in Canada as well as in the U.S.A.

Figure 4:
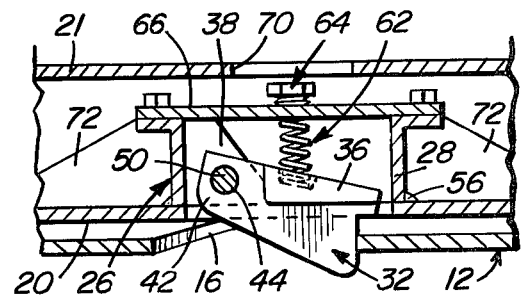
FIG. 4 is a fragmentary, sectional view similar to the center portion of FIG. 2, but showing parts of the safety stop device according to the invention moved to a position which prevents continued relative movement between the tractor and trailer of the associated tractor-trailer combination.

Each safety stop device 24 includes a body 26 advantageously in the form of a sleeve 28 which forms a cavity 30 of substantially rectangular cross section. Pivotally mounted within cavity 30 is a block 32 arranged for engaging slot 16 of fifth wheel 12 as shown in FIG. 4 whenever the coupler base member 20 pivots a predetermined excessive amount. In general, this excessive amount is more than 90° from the collinear disposition of the tractor 10 and trailer 18 as shown in FIG. 1.

Block 32 is provided with a pair of oppositely directed projections 34 and 36 which contact in the FIG. 4 position associated ones of oppositely directed shoulders 38 and 40 provided on the inner surface of sleeve 28 so as to extend into cavity 30. By this arrangement, when block 32 is disposed in slot 16, as shown in FIG. 4, any blows received by block 32 will be transmitted to the shoulders 38 and 40 and not the pivotal mounting of block 32. Thus, block 32 is able to withstand extremely severe impact and continuous forces on it without releasing.

Block 32 is advantageously of the illustrated generally wedge-shape having an apex 42 in which a through hole 44 is provided. A pair of opposed apertures 46 and 48 are provided in the side walls of sleeve 28 so that a shaft 50 can be journaled in hole 44 and apertures 46, 48 for pivotally mounting block 32 in the cavity 30 of sleeve 28. Shaft 50 may be retained within apertures 46, 48 and hole 44 in a conventional manner, such as by the illustrated cotter pins 52 and 54. As can be readily appreciated from the drawings, hole 44 extends in a plane parallel to the plane of extension of the oppositely directed projections 34 and 36 so that block 32 will pivot about the plane of the projections 34 and 36 and permit the latter to engage shoulders 38 and 40 whenever block 32 is in the position shown in FIG. 4.

Sleeve 28 is secured to base member 20 in a suitable manner, such as by welding, and is disposed so as to surround an opening 56 provided in base member 20. Block 32 normally is disposed partially in opening 56, and it is through opening 56 that block 32 moves when slot 16 is aligned with opening 56. Normally, block 32 will rest against and slide over the upper surface of the fifth wheel 12.

Disposed about base member 20 is a floor 58 of the trailer, while spacing floor 58 from base member 20, are a pair of conventional rails 60, and the like.

A, for example, coiled compression spring 62 is arranged between and engages both a seat member 64 adjustably mounted in a cover member 66 disposed secured to the top of sleeve 28 as by the illustrated flanges and cooperating screw fasteners, and an indentation and pin assembly 68 formed in the upper surface of block 32. Provision of a window 70 in floor 58 permits adjustment of the seat member 64, which is advantageously in the form of a threaded cup-shaped member having a screw head formed at the base thereof and disposed in inverted orientation within a suitably disposed threaded aperture provided in cover member 66.

Spring 62 functions to bias block 32 against the upper surface of fifth wheel 12 and into slot 16 when the latter is in alignment with opening 56 provided in base member 20. Thus, a positive stop action is obtained whenever slot 16 and opening 56 are aligned due to the force exerted on block 32 by the spring 62. This positive action is enhanced by constructing block 32 from a heavy material, such as from a solid block of steel and the like.

Suitable gussets 72 and other reinforcing members (not shown) are advantageously welded, and the like, to base member 20 and sleeve 28 in order to assure the rigidity and strength of the connection between sleeve 28 and the upper surface of base member 20. It is important that the body 26 of each of the devices 24 be securely mounted on the base member 20 about their associated openings 56.

As can be readily understood from the above description and from the drawings, the main purpose of the invention is to prevent a contact between the trailer and the tractor unit of a tractor-trailer combination when the combination is backing up, parking, or when a jackknifing occurs. In the latter instance, the invention will prevent serious damage to both the trailer and tractor, as well as reduce the possibility of personal injury to the operator of the rig, or to other persons. The pressure created by the locking device is stronger than the tractor fifth wheel pin 22 and if the force is sufficient, the tractor fifth wheel pin 22 wll shear off separating the trailer 18 from the tractor 10. The trailer 18 will then drop and cause the air brake hoses (not shown) which conventionally run from the tractor to the trailer wheels (not shown) to snap off causing the trailer wheels to lock in their intended manner. The fifth wheel pin 22 on a tractor-trailer combination is a separate unit which can be readily replaced and, therefore, its being sheared off will not destroy or impair the unit. The devices 24 which will be understood to only operate one at a time, can act to separate the tractor 10 and the trailer 18, and will minimize damage to both the tractor and the trailer as well as its cargo (not shown). Such damage is frequently caused when the tractor is swiveled around into the trailer unit in a jackknifing situation. A separation of the units by the invention by cause a great benefit by reason of decreased property damage and personal injury. Another advantage of the invention is that it cannot inadvertently be engaged by all normal uses of travel, turns, backing and turning, while making deliveries, and the like, because it requires a greater than a 90° angle and, therefore, at normal use to cause the device to engage. It is important to note that this is purely mechanical engagement, and with ordinary normal maintenance, the devices according to the invention should not fail to engage in the proper circumstances. It is anticipated that this device will be particularly advantageous on slippery roads and in snow and ice conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a tractor-trailer combination including a tractor having a fifth wheel provided with a guide slot, a trailer having a coupler base member provided with a depending fifth wheel pin pivotally engaging in the slot of the fifth wheel, and safety stop means for limiting pivotal movement of the base member relative to the fifth wheel and preventing the trailer and tractor from coming around and striking one another when the tractor-trailer combination is parking, backing, and involved in jackknifing situations, the improvement wherein the safety stop means has greater shear strength than the fifth wheel pin for causing the fifth wheel pin to shear before the safety stop means and separating the trailer from the tractor, the safety stop means comprising a projection movably mounted on the base member and arranged for engaging the slot of the fifth wheel whenever the relative angle between the base member and fifth wheel slot exceeds a predetermined value.

2. In a tractor-trailer combination including a tractor having a fifth wheel provided with a guide slot, a trailer having a coupler base member provided with a depending fifth wheel pin pivotally engaging in the slot of the fifth wheel, and safety stop means for limiting pivotal movement of the base member relative to the fifth wheel and preventing the trailer and tractor from coming around and striking one another when the tractor-trailer combination is parking, backing, and involved in jackknifing situations, the improvement wherein the safety stop means has greater shear strength than the fifth wheel pin for causing the fifth wheel pin to shear before the safety stop means and separating the trailer from the tractor, the safety stop means comprising, in combination:

(a) a body mountable on the base member; and (b) a block pivotally mounted on the body and arranged for engaging the slot of the fifth wheel whenever the relative angle between the base member and fifth wheel slot exceeds a predetermined value, the body being a sleeve forming a cavity, the base member being provided with an opening communicating with the cavity, with the block being pivotally mounted within the cavity and provided with a projection, and a shoulder provided in the sleeve and disposed extending into the cavity, the projection contacting the shoulder when the block is disposed in the slot of the fifth wheel and transmitting blows received by the block to the shoulder and away from the pivotal mounting of the block.

3. In a tractor-trailer combination including a tractor having a coupler base member provided with a depending fifth wheel pin pivotally engaging in the slot of the fifth wheel, and safety stop means for limiting pivotal movement of the base member relative to the fifth wheel and preventing the trailer and tractor from coming around and striking one another when the tractor-trailer combination is parking, backing, and involved in jackknifing situations, the improvement wherein the safety stop means has greater shear strength than the fifth wheel pin for causing the fifth wheel pin to shear before the safety stop means and separating the trailer from the tractor, the safety stop means comprising, in combination:

(a) a body mountable on the base member; and (b) a block pivotally mounted on the body and arranged for engaging the slot of the fifth wheel whenever the relative angle between the base member and fifth wheel slot exceeds a predetermined value, the body being a sleeve forming a cavity of substantially rectangular cross section, the base member being provided with an opening communicating with the cavity, with the block being pivotally mounted within the cavity and provided with a projection, and a shoulder provided in the sleeve and disposed extending into the cavity, the projection contacting the shoulder when the block is disposed in the slot of the fifth wheel and transmitting blows received by the block to the shoulder.

4. An improvement as defined in claim 3, wherein the block is of wedge-shape with an apex, a through hole provided in the apex, and the block includes a pair of oppositely directed projections extending from the block parallel to the through hole, with a pair of opposed shoulders being provided within the sleeve for contacting the projections when the block is disposed in the slot of the fifth wheel, the safety stop means further comprising a pair of opposed apertures provided in the sleeve and a shaft arranged in the apertures and the through hole of the block for pivotally mounting the block in the sleeve.

5. An improvement as defined in claim 3, wherein the safety stop means further comprises a cover member arranged over the sleeve, and a coil compression spring arranged between and contacting the cover member and the block for biasing the block toward the opening provided in the base member and toward the fifth wheel and into the slot provided in the fifth wheel whenever the slot is in alignment with the opening provided in the base member.

6. An improvement as defined in claim 5, wherein the safety stop means comprises a pair of bodies having associated blocks and springs, each of the bodies being disposed on the base member equal distance from and along a plane passing through the fifth wheel pin.

7. A safety stop device for limiting movement between a semi-trailer coupler base member and a fifth wheel of an associated tractor, comprising, in combination:

(a) a body mountable on the coupler base member; and (b) a block pivotally mounted on the body and arranged for engaging a slot provided in the fifth wheel of the tractor whenever the angle between the tractor and trailer exceeds a predetermined value, the body being a sleeve forming a cavity, the base member being provided with an opening communicating with the cavity, with the block being pivotally mounted within the cavity and provided with a projection, and a shoulder provided in the sleeve and disposed extending into the cavity, the projection contacting the shoulder when the block is disposed in the slot of the fifth wheel and transmitting blows received by the block to the shoulder and away from the pivotal mounting of the block.

8. A safety stop device for limiting movement between a semi-trailer coupler base member and a fifth wheel of an associated tractor, comprising, in combination:
   (a) a body mountable on the coupler base member; and
   (b) a block pivotally mounted on the body and arranged for engaging a slot provided in the fifth wheel of the tractor whenever the angle between the tractor and trailer exceeds a predetermined value, the body being a sleeve forming a cavity of substantially rectangular cross section, the base member being provided with an opening communicating with the cavity, with the block being pivotally mounted within the cavity and provided with a projection, and a shoulder provided in the sleeve and disposed extending into the cavity, the projection contacting the shoulder when the block is disposed in the slot of the fifth wheel and transmitting blows received by the block to the shoulder, the block being of wedge-shape with an apex, a through hole provided in the apex, the block including a pair of oppositely directed projections extending from the block parallel to the through hole, with a pair of opposed shoulders being provided within the sleeve for contacting the projections when the block is disposed in the slot of the fifth wheel, the safety stop means further comprising a pair of opposed apertures provided in the sleeve and a shaft arranged in the apertures and the through hole of the block for pivotally mounting the block in the sleeve.

9. A safety stop device for limiting movement between a semi-trailer coupler base member and a fifth wheel of an associated tractor, comprising, in combination:
   (a) a body mountable on the coupler base member; and
   (b) a block pivotally mounted on the body and arranged for engaging a slot provided in the fifth wheel of the tractor whenever the angle between the tractor and trailer exceeds a predetermined value, the body being a sleeve forming a cavity of substantially rectangular cross section, the base member being provided with an opening communicating with the cavity, with the block being pivotally mounted within the cavity and provided with a projection, and a shoulder provided in the sleeve and disposed extending into the cavity, the projection contacting the shoulder when the block is disposed in the slot of the fifth wheel and transmitting blows received by the block to the shoulder, the safety stop means further comprising a cover member arranged over the sleeve, and a coil compression spring arranged between and contacting the cover member and the block for biasing the block toward the opening provided in the base member and toward the fifth wheel and into the slot provided in the fifth wheel whenever the slot is in alignment with the opening provided in the base member.

10. A structure as defined in claim 9, wherein the block is of wedge-shape with an apex, a through hole provided in the apex, and the block including a pair of oppositely directed projections extending from the block parallel to the through hole, with a pair of opposed shoulders being provided within the sleeve for contacting the projections when the block is disposed in the slot of the fifth wheel, the safety stop means further comprising a pair of opposed apertures provided in the sleeve and a shaft arranged in the apertures and the through hole of the block for pivotally mounting the block in the sleeve.

* * * * *